(12) United States Patent
Tronolone

(10) Patent No.: US 9,910,805 B2
(45) Date of Patent: Mar. 6, 2018

(54) PATCH PANEL AND DISTRIBUTION AMPLIFIER WITH CONFIGURABLE INPUT/OUTPUT MODULE

(71) Applicant: James Tronolone, Hackensack, NJ (US)

(72) Inventor: James Tronolone, Hackensack, NJ (US)

( * ) Notice: Subject to any disclaimer, the term of this patent is extended or adjusted under 35 U.S.C. 154(b) by 192 days.

(21) Appl. No.: 14/999,026

(22) Filed: Mar. 21, 2016

(65) Prior Publication Data

US 2016/0350252 A1   Dec. 1, 2016

Related U.S. Application Data

(60) Provisional application No. 62/230,076, filed on May 28, 2015.

(51) Int. Cl.
  *G06F 13/40* (2006.01)
  *H04Q 1/02* (2006.01)

(52) U.S. Cl.
  CPC ...... *G06F 13/4022* (2013.01); *G06F 13/4068* (2013.01); *H04Q 1/13* (2013.01); *H04Q 1/133* (2013.01); *H04Q 1/135* (2013.01)

(58) Field of Classification Search
  CPC ..... G06F 13/422; G06F 13/4068; H04Q 1/13; H04Q 1/133; H04Q 1/135
  See application file for complete search history.

(56) References Cited

U.S. PATENT DOCUMENTS

| | | | | |
|---|---|---|---|---|
| 6,078,507 A | * | 6/2000 | Tronolone | H04H 60/04 174/650 |
| 6,589,062 B1 | * | 7/2003 | Ogren | H01R 13/7032 439/188 |
| 7,054,163 B2 | * | 5/2006 | Coffey | H04Q 1/14 361/730 |
| 7,570,487 B2 | * | 8/2009 | Clark | H05K 7/1425 361/715 |
| 2013/0091532 A1 | * | 4/2013 | Reynolds | H04B 7/2606 725/118 |

* cited by examiner

*Primary Examiner* — Eric Oberly
(74) *Attorney, Agent, or Firm* — Thomas L. Adams

(57) ABSTRACT

A combination patch panel and distribution amplifier within a single housing composed of a plurality of card modules which may have a data format interface with a configurable input/output module known as small footprint plugables for the transmission and distribution of signals, data, and the like, in either serial digital mode, internet protocol mode or other signals, each card module configurable to provide for any front panel jack functioning as a repeater output from external source, input distribution amplifier, output distribution amplifier, or destination jack.

10 Claims, 2 Drawing Sheets

PATCH PANEL AND DISTRIBUTION AMPLIFIER WITH CONFIGURABLE INPUT/OUTPUT MODULE

RELATED APPLICATIONS

Applicant claims the benefit of provisional application Ser. No. 62/230,076, filed May 28, 2015.

BACKGROUND OF THE INVENTION

1. Field of the Invention

The present invention relates to a patch panel system of multiple card modules, each of which incorporate an input repeater circuit and distribution amplifier, and a configurable input/output module for the patching of audio, video, data, recording, broadcasting, and telecommunication lines, the panel able to patch not only serial digital transmissions, but also packet information transmitted by means of fiber optic, internet protocol and others via a data format interface or small footprint pluggable (SFP).

2. Description of the Prior Art

Jack panels or patch panels are well-known in the broadcasting, telecommunication and other audio and video industries where they are used extensively to provide flexibility in the interconnection of audio, video or data circuits. By employing a patch panel, various circuits can be connected together temporarily using one or more patch cords provided with plugs that are received in a plurality of jacks mounted in the panel of the patch panel. In a typical installation, a plurality of patch panels would be utilized with each patch panel having a plurality of input wires and output wires secured thereto and connected to an article of electrical equipment be it a telephone, video monitor, computer, computer monitor or the like. The distribution of the signals further required a plurality of wires interconnecting the patch panels with distribution amplifiers to insure the quality of the signal as it is directed between the various desired electrical equipment. This requirement of interconnecting the patch panels with a plurality of distribution amplifiers increases the cost of installing a facility where audio, video and data transmission and interconnection is required and further increases the cost of maintaining such a system. Applicant addressed the problem and developed a solution as evidenced by U.S. Pat. No. 6,078,507.

Applicant now has further developed the patch panel with incorporated distribution amplifiers to include a data format interface and a configurable input/output module with each card module which allow the patch panel to handle transmitted coaxial cable transmissions which essentially are serial digital as well as handle those transmissions which are being developed and utilize the fiber optic, internet protocol and others for transmission. The configurable input/output module is also known as a small footprint pluggable or SFP.

OBJECTS OF THE INVENTION

An object of the present invention is to provide for a novel patch panel having multiple card modules each incorporating a repeater circuit and distribution amplifier and may also incorporate a data format interface with a configurable input/output module known as small footprint plugables or SFPs.

A further object of the present invention is to provide for a novel combination patch panel with multiple card modules incorporating an input repeater circuit, a distribution amplifier, and a data format interface with configurable input/output module which can accommodate a coaxial cable input in serial digital transmission form and also fiber optic, video internet protocol, analogue, digital, HDMI, or DVI and other inputs via the data format interface.

SUMMARY OF THE INVENTION

A combination patch panel and distribution amplifier within a single housing composed of a plurality of card modules which may have a data format interface with a configurable input/output module known as small footprint plugables for the transmission and distribution of signals, data, and the like, in either serial digital mode, internet protocol mode or other signals, each card module configurable to provide for any front panel jack functioning as a repeater output from external source, input distribution amplifier, output distribution amplifier, or destination jack.

BRIEF DESCRIPTION OF THE DRAWINGS

These and other objects of the present invention will become apparent, particularly when taken in light of the following illustrations wherein.

DETAILED DESCRIPTION OF THE INVENTION

Figure 1:
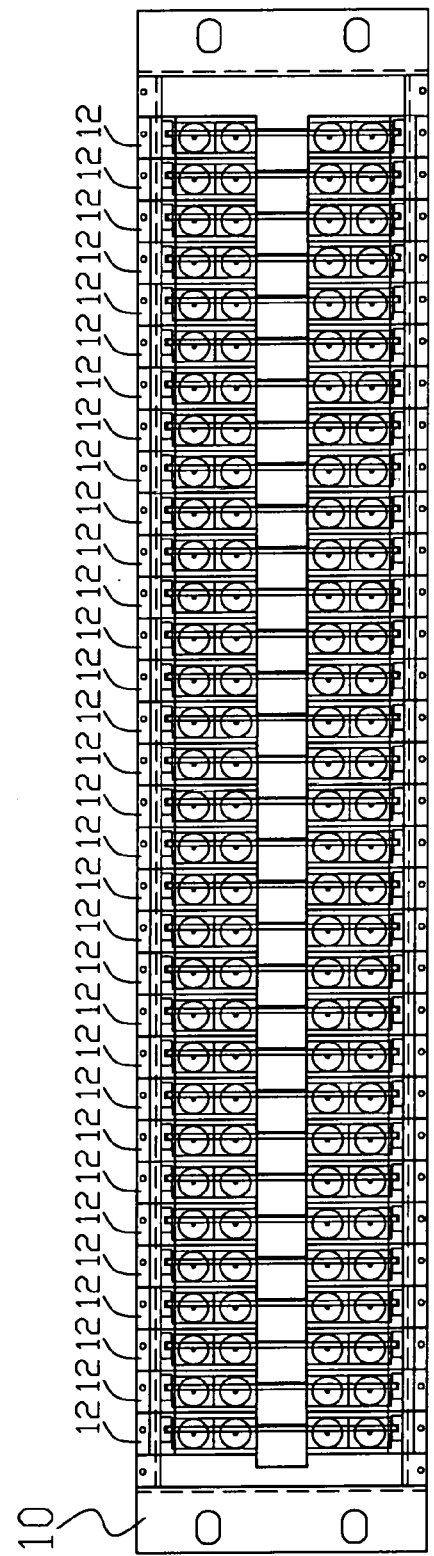
FIG. 1 is a front view of the housing for a combination patch panel distribution amplifier incorporating a plurality of card modules each having a configurable in/out module.

FIG. 1 is a front view of the housing 10 illustrating multiple card modules 12, which are slidably received within the housing. Card modules 12 are slidably inserted into the housing 10 on individual tracks and as such can be individually replaced if necessary.

Figure 2:
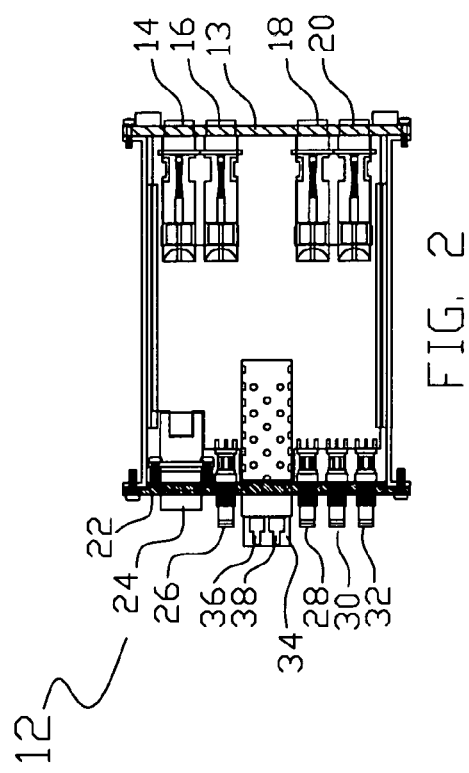
FIG. 2 is a side cutaway view of an individual card module of the combination patch panel distribution amplifier with configurable input/output module.

FIG. 2 illustrates a side cutaway view of card module 12. Each card module 12 has a front face 13 having a pair of upper front panel jack patches 14 and 16, and a pair of lower front panel jack patches 18 and 20. The rear face 22 of the card module 12 has a connection 24 for a power source and communications system for the card module, an upper coaxial input 26, three lower coaxial outputs 28, 30, and 32, and a configurable input/output module 34 which serves as a data format interface to receive fiber optic, internet protocol, analogue, digital, coaxial, HDMI, DVI, or other signals. The configurable input/output module is illustrated with an input connector 38 and an output connector 36. The configurable input/output module 34 may also be configured with a second input and output or configured with just a single input and no output or the reverse, a single output and no input. Interposed between the rear face 22 and the front face 13 of the card module 12 are an input repeater circuit 40 and a distribution amplifier 42.

Figure 3:
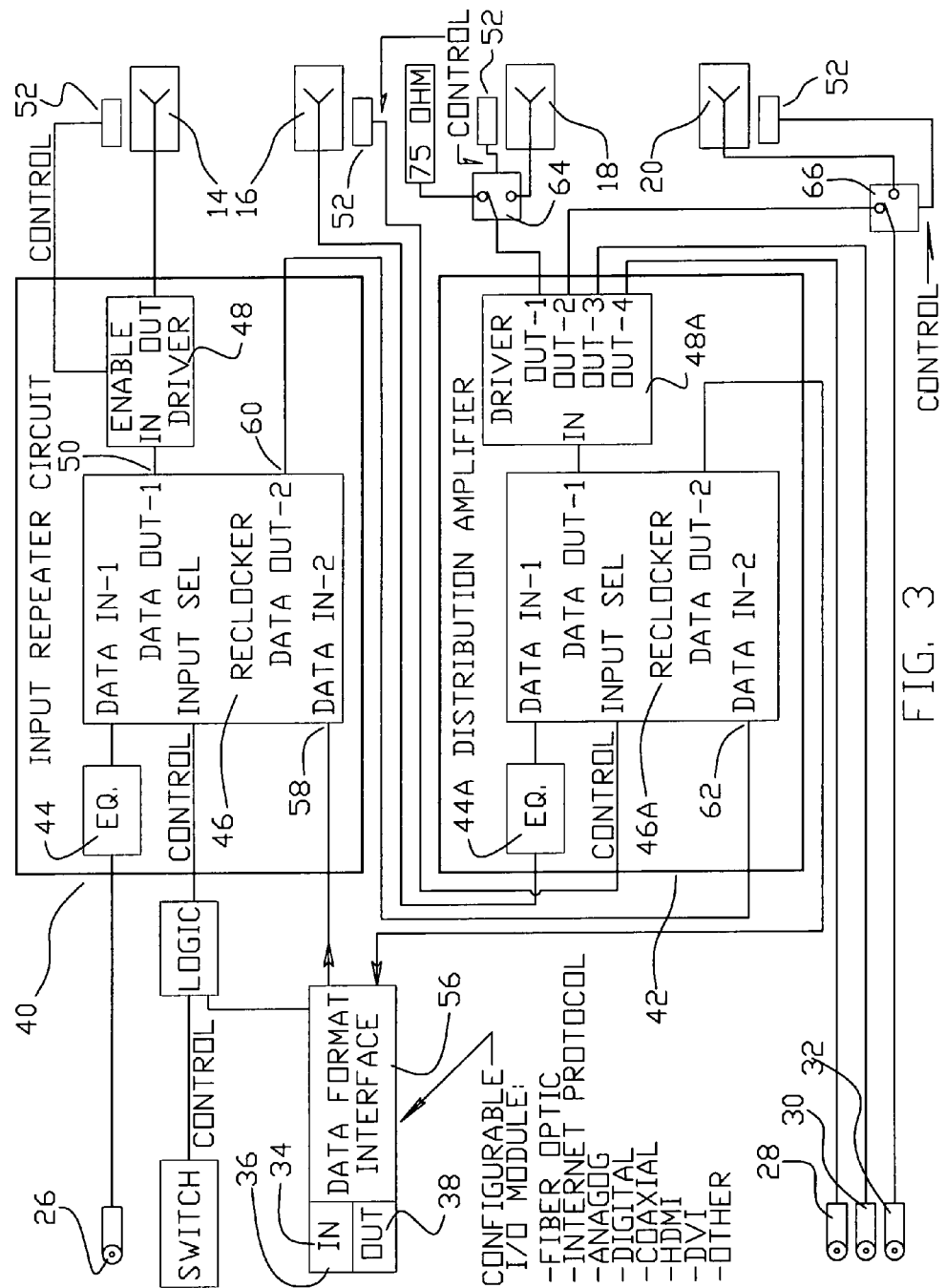
FIG. 3 is a block circuitry diagram of one of the plurality of card modules of the patch panel.

FIG. 3 is a block circuitry diagram of the internal wiring of one of the card modules 12 that comprise the patch panel distribution amplifier circuit within the module. It should be noted that the circuitry as illustrated in FIG. 3 is completely configurable and that its purpose is to provide four distinct capabilities for the four front panel jack patches associated with each card module. The four processes are a repeater output from a source; an input distribution amplifier; an output distribution amplifier; and a destination jack patch. In the description which follows, the circuitry as illustrated in FIG. 3 provides for front panel jack patch 14 to function as the repeater output from source jack, front jack panel 16 to function as the input distribution amplifier; front panel jack patch 18 functioning as the output distribution amplifier; and front panel jack patch 20 functioning as the destination jack. It is intended therefore to provide for sufficient front panel jacks on each card module which could provide either one of the aforesaid functions, or the card module could be configured so that all of the front panel jacks perform the same function.

The input repeater circuit 40 can receive signals from upper coaxial input 26 on rear face 22. Such signal is directed to a cable equalizer 44 which stabilizes the signal. The equalized signal is then directed to a reclocker 46, and then to a cable driver 48 via first data output 50 and then directed to an upper front panel jack patch 14. The upper front panel jack patch 14 and all front panel jack patches 14-20 are associated with patch cord sensors 52 which can sense the presence of a jack within the receptacle. The patch card sensor 52 associated with upper front jack panel 14 would signal the cable driver 48 identifying the jack's presence.

The module 12 can also receive signals via the configurable input/output module 34 from fiber optic, internet protocol, analogue, digital, coaxial, HDMI and DVI signals, as well as others. These signals are directed through a data format interface 56 and then to a data input 58 within the input repeater circuit 40. This signal is then relayed from a data output 60 of the input repeater circuit 40 to a distribution amplifier 42 at data input 62. The signal from data input 62 is then directed to output 36 in configurable input/output module 34 on the rear face of card module 12. The distribution amplifier 42 can also receive a signal from front panel jack patch 16 which would encounter a second cable equalizer 44A within distribution amplifier 42. The signal would be subjected to a reclocker 46A and then sent via a data output to a cable driver 48A, which in turn directs the signal to one of four locations. The first location would be a lower front panel jack patch 18. The second output either goes to coax output #32 or to front panel jack patch 20 via normal switch 66. The third and fourth outputs could be sent to the coaxial output connections 28 and 30 on the rear face of the housing.

The lower front panel jack patches are in communication with outlet cable driver 48A there being interposed therebetween a normal switch 64 and 66 for opening and closing the circuitry. When a jack is inserted into lower front panel jack patch 20, the normal switch is directed to connect at the lower front patch front panel jack patch 20 directly to a coaxial output on the rear face of the module. The normal switch is controlled by a control signal generated by the patch cord sensor 52. When a jack is inserted into lower front panel jack patch 18, sensor 52 signals normal switch 64 so that upper front jack panel patch receives a signal from cable driver 48A of distribution amplifier 42.

This product gives a user the means to interface serial digital coaxial systems to new and existing formats. The system allows the user to easily add new formats, such as fiber optic and internet protocol, to an existing system. By utilizing the patch panels they can test sources and destinations from front panel jacks and are able to redirect signals as needed via use of the patch cord and the incorporated distribution amplifiers. Also, in new systems, the user can design a hybrid system that would utilize both serial digital coaxial equipment and new fiber or internet protocol equipment.

While the invention has been disclosed with respect to the preferred embodiment thereof, it will be recognized of those of ordinary skill in the art that many modifications will be apparent and this application is intended to cover any adaptations or variations thereof. Therefore, it is manifestly intended that this invention be only limited by the claims and the equivalence thereof.

I claim:

1. An improved patch panel assembly for patching audio, video, or data circuits, and including the transmission and distribution of signals in either serial digital mode, or internet protocol mode, the assembly comprising:
   a housing having a front face and a rear face;
   a plurality of card modules slidably received within said housing between said front face and said rear face, each card module having upper front panel jack patches, and lower front panel jack patches, said rear face of said card module having a power source connection, a coaxial input, and three coaxial outputs, and a configurable data format interface for reception of signals in fiber optic, internet protocol, analogue, digital, coaxial, HDMI, or DVI mode, said data format interface including a configurable input/output module; and
   an input repeater circuit and a distribution amplifier incorporated in each of said card module and interposed between said front face and said rear face of said card modules.

2. The improved patch panel assembly in accordance with claim 1 wherein each of said plurality of card modules are configurable to provide one or more functions through said upper and lower front panel jacks, said functions being a repeater output from a source; an input distribution amplifier; an output distribution amplifier; and a destination jack patch.

3. The improved patch panel assembly in accordance with claim 2 wherein said upper front panel jack patches comprise at least two jack patches, and said lower front panel jack patches comprise at least two jack patches.

4. The improved patch panel assembly in accordance with claim 1 wherein each of said front panel jack patches incorporates a jack sensor indicating the presence or absence of a jack within said jack patches.

5. The improved patch panel in accordance with claim 1 wherein said configurable input/output of said data format interface is configurable to include a plurality of inputs and a plurality of outputs.

6. The improved patch panel assembly in accordance with claim 1 wherein said configurable input/output of said data format interface is configurable to include a plurality of outputs only.

7. The improved patch panel assembly in accordance with claim 1 wherein said configurable input/output of said data format interface is configurable to include a plurality of inputs only.

8. The improved patch panel assembly in accordance with claim 1 wherein said coaxial input on said rear face of said card module communicates with said input repeater circuit and a cable equalizer and cable drive enabler within said input repeater circuit which further communicates with a first front panel upper patch for patching a signal from said coaxial input on said rear face of said module.

9. The improved patch panel assembly in accordance with claim 1 wherein an input signal into said configurable input/output module on said rear face of said module communicates with said input repeater circuit and reclocker positioned therein, said received signal in further communication with said distribution amplifier and then in further communication with an output interface on said configurable input/output module on said rear face of said module for transmitting a signal.

10. The improved patch panel assembly in accordance with claim 1 wherein said lower front panel jack patches are each in communication with a dedicated normalizing switch and further communication with said distribution amplifier and a cable driver positioned therein for relaying transmission signals to said selected three coaxial lower outputs on said rear face of said module.

\* \* \* \* \*